Dec. 2, 1969          O. J. LOBB          3,481,588
HUMIDIFIER
Filed Jan. 25, 1968          2 Sheets-Sheet 1
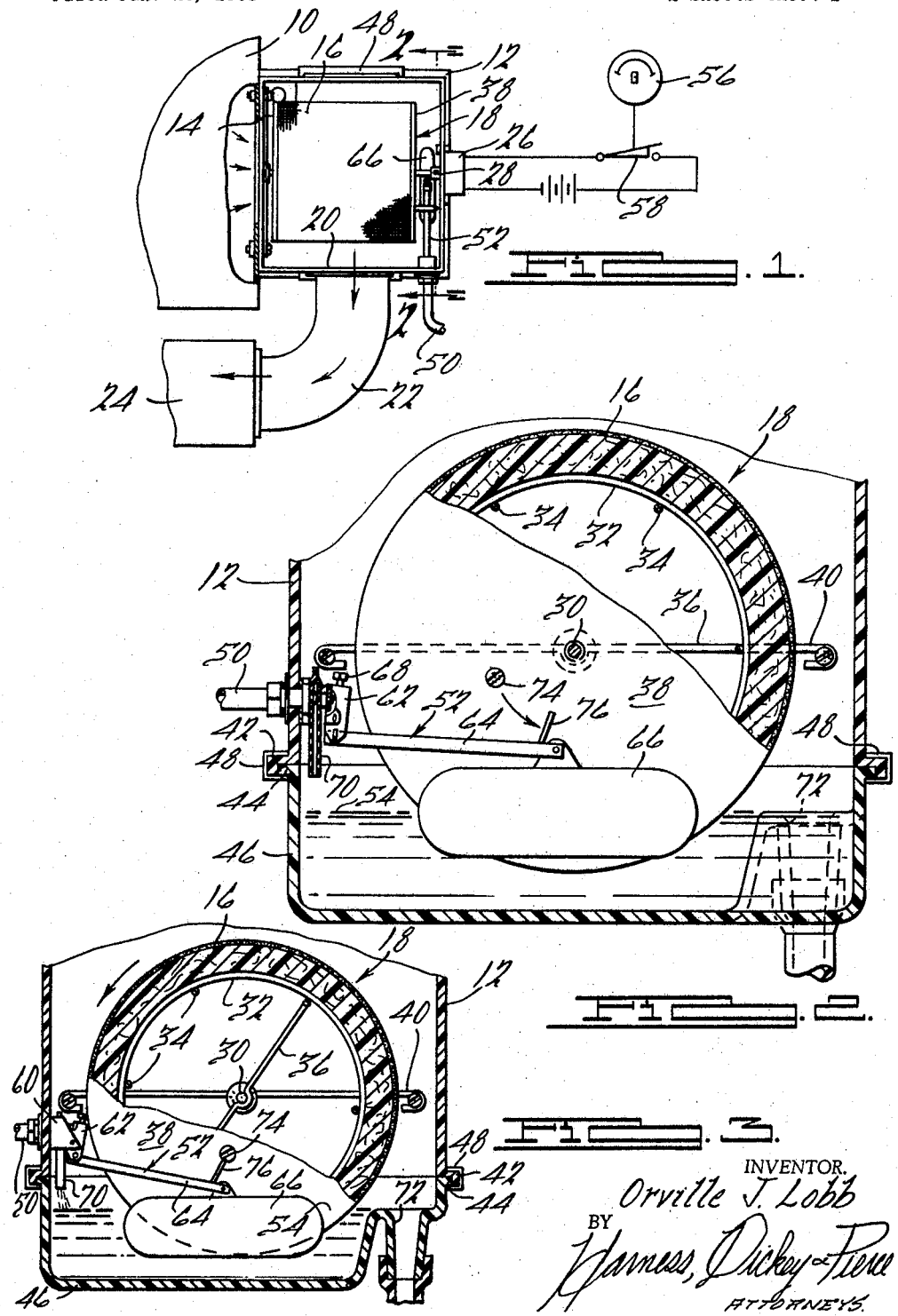
INVENTOR.
Orville J. Lobb
BY
Harness, Dickey & Pierce
ATTORNEYS.

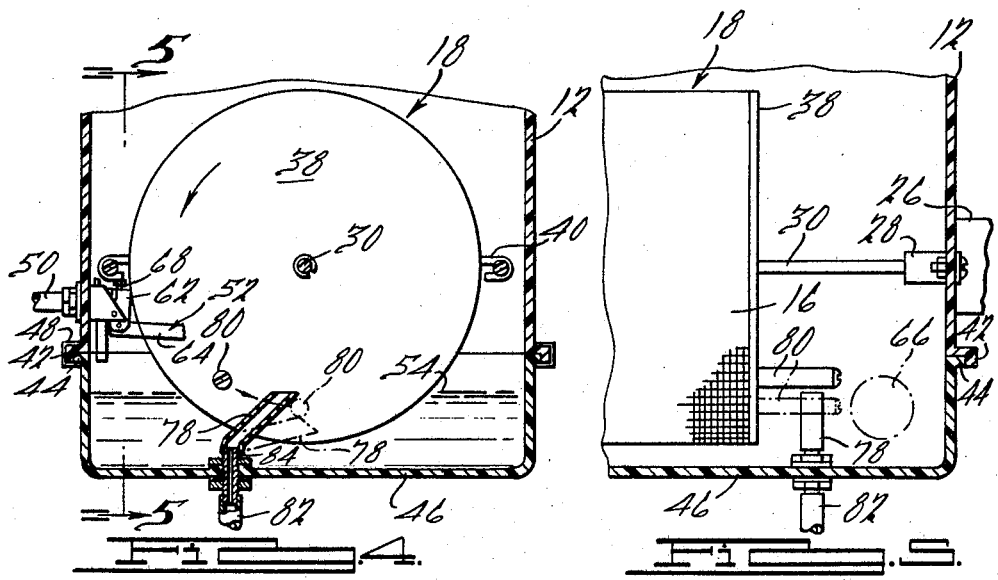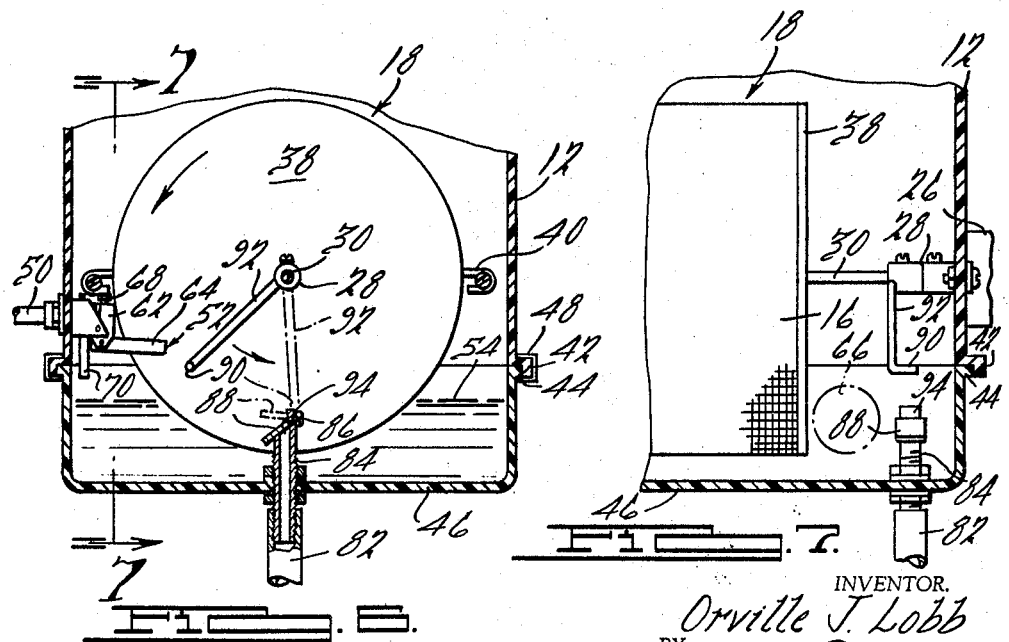

United States Patent Office

3,481,588
Patented Dec. 2, 1969

3,481,588
HUMIDIFIER
Orville J. Lobb, Royal Oak, Mich., assignor to Lobb Humidifier Co., a corporation of Michigan
Filed Jan. 25, 1968, Ser. No. 700,629
Int. Cl. B01d 1/00
U.S. Cl. 261—2                                5 Claims

ABSTRACT OF THE DISCLOSURE

An automatic power humidifier for increasing the humidity of moisture deficient air including an enclosure having a rotary evaporating assembly mounted therein and positioned with its lower portion in a reservoir of water, which is intermittently flushed in response to the movement of the evaporating assembly to inhibit the accumulation of mineral deposits on the internal components of the humidifier.

BACKGROUND OF THE INVENTION

Humidifying devices of various types are in widespread use for eliminating the discomfort and unhealthful conditions in residential, commercial and industrial environments occasioned by excessively low humidity levels. The unhealthful conditions and discomfort associated with low levels of humidity is particularly prevalent in localities in which the outdoor temperature during the winter months frequently is below freezing for prolonged periods of time, necessitating a substantial amount of heating in order to maintain appropriate indoor temperature levels. Under such or similar conditions, it is not uncommon to evaporate upwards of 15 gallons of water per day for an average-sized dwelling to raise the moisture content to within an acceptable range.

The relatively large quantities of water required to maintain a comfortable moisture content under such conditions has resulted in the depositing of appreciable amounts of mineral deposits or residue on the evaporative media and internal components of humidifying devices heretofore known, resulting in a substantial reduction in their operating efficiency. This problem is particularly pronounced in localities wherein the water is characterized as containing substantial quantities of dissolved minerals therein. In order to maintain an acceptable operating efficiency of such humidifying devices, it has heretofore been necessary to subject the evaporative media and other operating components to frequent cleaning or replacement to remove the hard mineral encrustations therefrom. The periodic cleaning of humidifying devices constitutes a time-consuming and tedious practice, and for this reason, particularly in residential use, is not done at the required frequency, such that the humidifying devices do not operate at their design capacity, thereby substantially detracting from the benefits obtainable from their use.

Attempts to overcome the problems associated with the mineral residue formed in humidifying apparatuses of the types heretofore known have not been entirely satisfactory for one or more reasons. In some apparatuses, the supply of water to the evaporative reservoir is provided in a substantial excess and without regard to the quantity of water being evaporated by the device to provide a constant flushing thereof, resulting in a substantial wasting of water. In other humidifying devices, a constant or intermittent flushing action of the water reservoir is provided employing components which themselves are susceptible to malfunction as the result of the depositing of mineral residue thereon, rendering such flushing mechanisms inoperative after only short periods of operation.

The foregoing problems associated with prior art type humidifying devices is overcome in accordance with the flushing mechanism of the present invention, which effectively inhibits the formation of mineral deposits on the evaporative media and internal components of a humidifying device, which employs only a minimal amount of water, which provides reliable and durable operation and which is operable in direct correlation to the quantity of water being evaporated by the humidifying device.

SUMMARY OF THE INVENTION

The foregoing and other advantages and benefits of the present invention are achieved by a humidifier apparatus consisting of an enclosure within which a reservoir of water is contained and an evaporating assembly is rotatably mounted such that the lower portion of the evaporative media thereon dips into the water reservoir. Suitable control means are provided for regulating the supply of water to the reservoir so as to maintain the lever thereof at a preselected height and flushing mechanism is incorporated which is operable in response to the rotation of the evaporating assembly to effect a drainage of a portion of the water in the reservoir which is replenished so as to maintain the reservoir at the preselected lever.

In accordance with one embodiment of the present invention, the flushing action is achieved intermittently by means of coacting means on the evaporating assembly which is adapted to contact and override the liquid level control to supply an excess amount of water to the reservoir, and which excess is removed through an overflow weir. In accordance with an alternative embodiment of the present invention, an intermittent flushing of the reservoir is accomplished by coacting means operative to deflect an overflow weir or to open a port therein to effect a drainage of a portion of the water from the reservoir which in turn is replenished by the water supply control means.

Other advantages and benefits of the present invention will become apparent upon a reading of a description of the preferred embodiments taken in conjunciton with the accompanying drawings.

BRIEF DESCRIPTION OF THE DRAWINGS

FIGURE 1 is a plan view of a typical humidifier apparatus of the type to which the present invention is applicable mounted on the hot and cold air plenums of a forced-air furnace;

FIGURE 2 is a transverse vertical sectional view of the humidifier apparatus shown in FIGURE 1, and taken substantially along the line 2—2 thereof;

FIGURE 3 is a transverse vertical sectional view similar to that shown in FIGURE 2 but with the float control valve depressed, providing an intermittent flushing action of the water reservoir;

FIGURE 4 is a fragmentary vertical sectional view of the humidifier apparatus illustrating an alternative flushing mechanism in accordance with the present invention;

FIGURE 5 is a fragmentary vertical longitudinal sectional view of the humidifier apparatus shown in FIGURE 4, and taken substantially along the line 5—5 thereof;

FIGURE 6 is a fragmentary vertical sectional view of a humidifier incorporating another embodiment of a flushing mechanism; and FIGURE 7 is a fragmentary vertical longitudinal sectional view of the humidifier apparatus shown in FIGURE 6, and taken substantially along the line 7—7 thereof.

DESCRIPTION OF THE PREFERRED EMBODIMENTS

Referring now in detail to the drawings, and as may be best seen in FIGURE 1, a humidifier apparatus of the type to which the present invention is applicable is shown mounted on a wall of a hot air plenum 10 of a forced-air furnace. The humidifier apparatus comprises a three-dimensional enclosure or cabinet 12, which is formed with an inlet port 14 in a wall disposed adjacent to the hot air plenum 10, through which heated air is drawn and passes in evaporating relationship with respect to an evaporating media 16 on a rotary evaporating assembly 18 mounted within the enclosure. The humidified air passes from the interior of the enclosure 12 through an outlet port 20 provided in one wall of the enclosure 12 which is disposed in communication with an elbow duct 22, which in turn is connected to a cold air plenum 24 of the furnace.

The arrangement as hereinabove described and as illustrated in FIGURE 1 is representative of a so-called by-pass system in which a portion of the heated air from the hot air plenum of a furnace is by-passed through the humidifier apparatus to the low pressure side of the cold air plenum and becomes admixed with the return air. In such installations, the blower of the forced-air furnace is employed to effect movement of the by-passed air through the humidifier apparatus.

It is also contemplated that the humidifier apparatus may incorporate an integral fan for drawing air through the enclosure to effect an increase in the moisture content thereof as in the case of convection-type hot air furnaces or portable humidifier units in which the device is placed at a convenient location within a room. It will be further understood that while the humidifier apparatus is shown in FIGURE 1 mounted directly on the wall of the hot air plenum 10, satisfactory operation can also be attained with a reversal of this arrangement by mounting the humidifier apparatus on the cold air plenum and connecting the interior of the enclosure thereof to the hot air plenum by a duct similar to the elbow duct 22.

In the exemplary embodiment illustrated in FIGURES 1–3, the rotary evaporating assembly comprises a synchronous motor 26 mounted exteriorly on one wall of the enclosure and has its output drive shaft connected by means of a coupling 28 to the end portion of a shaft 30 of a perforated drum or cylinder 32. The evaporating media 16 is disposed in the form of a continuous sleeve around the periphery of the drum 32 and extends to a position contiguous to the inner surface of the wall of the enclosure adjacent to the inlet port 14.

The evaporating media 16 may comprise any suitable material which is porous and possesses a substantially high surface area per unit volume, enabling the absorption and retention of substantial quantities of water therein. The evaporative media is preferably further characterized as being of a non-wicking type to minimize the transfer of water through the material by virtue of capillary or wicking action. Various materials which are suitable for this purpose include synthetic cellular plastic materials having an open cell structure characterized by interconnected voids, in addition to expanded kraft-type paper, which has been pretreated by impregnating a resinous material therein to improve its wet-strength and which further possesses slight absorptive qualities to facilitate the take-up of water. Various synthetic and naturally-occurring fibrous pads can also be employed for this purpose which are formed so as to provide a porous network possessing water absorptive qualities.

In the specific embodiment illustrated, the drum 32 is of an open wire construction consisting of a plurality of longitudinally extending wires or ribs 34 arranged in a circular configuration which are interconnected at their ends to suitable rims between which a cross shaft 36 extends. The end of the drum 32 adjacent to the motor 26 is closed by means of a circular end panel 38, which induces air passing inwardly of the inlet port 14 and into the adjacent open end of the evaporating assembly to pass radially outwardly through the cylindrical sleeve of evaporating media 16 therearound, enhancing the capacity and efficiency of vaporization of water therefrom. The drum 32 is supported at the end adjacent to the inlet port 14 by a cross bar 40, on which the projecting end of the central shaft 30 is rotatably supported.

The lower portion of the enclosure 12 is formed with an encircling flange 42, against which an encircling flange 44 on the base of the enclosure is adapted to be disposed in sealing abutting relationship. The base of the enclosure, as best seen in FIGURES 2 and 3, is formed in the shape of a pan 46, which is adapted to contain a body of water defining a reservoir into which the lower peripheral portion of the rotary evaporating assembly 18 is immersed. The pan 46 is removably connected to the upper portion of the closure such as by means of suitable C-shaped clamps 48 disposed in overlying relationship on the outer surfaces of the flanges 42 and 44.

The supply of water to the reservoir in the pan 46 is achieved by a supply conduit 50 connected to a suitable water source, which in turn is connected to a control device such as the float control valve assembly 52, which is adjustable so as to maintain the level indicated at 54 of the body of water at a preselected height. During normal operation of the humidifier apparatus, the float control valve serves to replenish water to the water reservoir at a rate at which the water is evaporated by the evaporating media 16.

It will be apparent from the foregoing arrangement that the rotation of the rotary evaporating assembly incorporating the evaporating media 16 therearound effects a progressive pick-up of water from the water reservoir which subsequently is evaporated therefrom by the passage of moisture deficient air through the evaporative media. The water evaporated is replenished upon immersion of the dried evaporative media during its re-entry into the water reservoir. The rotation of the drum and evaporating media is achieved by the motor 26, which preferably comprises a synchronous motor incorporating suitable reduction gearing therein so as to provide a speed of rotation of from about ½ to about 3 revolutions per minute. Synchronous motors having an output shaft speed of one revolution per minute have been found particularly satisfactory for use in connection with the arrangement as illustrated in the drawings.

In accordance with a preferred embodiment of the present invention, the control of the level of humidity within relatively narrow limits is accomplished by means of a suitable humidistat, indicated at 56 in FIGURE 1, which may be preset to the desired humidity level and can be conveniently located in an appropriate location in the building or, alternatively, in the upstream side of the cold air plenum to sense the level of humidity of the cold return air to the furnace. The humidistat 56, as diagrammatically illustrated in FIGURE 1, incorporates a suitable switch 58, which is disposed in series in the electrical circuit of the synchronous drive motor 26, such that upon attainment of the preselected humidity level, the synchronous motor is de-energized and the drum and evaporative media stop rotating. In the stationary position, the evaporative media dries out and no further humidification of the air passing therethrough is accomplished until such time that the humidity level again drops below a preselected level, in which event the switch 58 closes and the drum again commences to rotate. In installations wherein a humidistat is employed for controlling the humidity level of the surrounding air, it is essential that the evaporating media 16 on the drum be of a substantially non-wicking type to prevent saturation of the evaporating media above the level of the water in the reservoir when the drum is stationary.

During operation of the humidifier apparatus, the continuous evaporation of water from the evaporative media effects a deposition of mineral deposit on the surfaces thereof, some of which are dislodged during the immersion of the media in the water reservoir. In addition, the concentration of the dissolved minerals in the water reservoir progressively increases until a point is attained wherein a substantial residue of mineral deposits occurs, which causes a progressive loading of the evaporating media and a reduction in its porosity. The water in the reservoir also contains finely-divided particles of insoluble minerals which are suspended therein and subsequently agglomerate and precipitate on the evaporative media and on the internal components of the humidifier apparatus. It is for this reason that the pan 46 is removable to enable a periodic cleaning thereof, and that the evaporative media itself is removably mounted on the drum to enable periodic removal and a cleansing in a mild acid solution or a replacement thereof, if necessary, to maintain the operating efficiency of the unit.

In accordance with the present invention, the fouling of the evaporative media and internal components of the humidifier apparatus is substantially reduced by prodiving an intermittent flushing of the water reservoir with fresh water, effecting dilution of the concentration of dissolved minerals in the reservoir, as well as a sweeping of a portion of the suspended mineral particles therein, from the reservoir. This flushing action, in accordance with one embodiment of the present invention, is achieved by the arrangement as illustrated in FIGURES 1–3.

As may be best seen in FIGURES 2 and 3, the float control valve assembly 52 consists of a mounting bracket 60 connected to the inside surface of the pan 46 to the projecting end of which a bracket 62 is pivotally connected. A float arm 64 is adjustably mounted on the bracket 62 at one end thereof and a float 66 is pivotally mounted on the opposite end thereof. A suitable adjusting screw 68 is provided in the bracket 62 for adjusting the angular relationship of the float arm 64 relative thereto in order to select the particular height of the water level 54 desired.

In the exemplary float control valve assembly shown in FIGURES 2 and 3, the bracket 62 is formed with an anvil which is adapted to compress a resilient rubber tube 70, which is disposed in communication with the supply conduit 50 so as to effect a collapse thereof and restrict the flow of water therethrough. Upon a reduction in the level of water in the reservoir, the float moves downwardly and the float arm 64 effects a pivoting movement of the bracket 62 so as to partially release the flexible tube 70, enabling water to enter the reservoir to replenish the amount evaporated. The make-up water is discharged from the lower end of the tube 70 directly into the pan 46.

As best seen in FIGURES 1–3, the pan 46 is formed with an overflow weir 72 or stand pipe, the upper surface of which is disposed at or slightly about the height of the preselected water level 54 to be maintained in the water reservoir. Accordingly, during normal operation, no water passes through the overflow weir 72 since the float control valve assembly is effective to control the level of the reservoir at or slightly below the overflow height of the overflow weir.

In order to achieve an intermittent flushing of a portion of the water in the reservoir in accordance with one embodiment of the flushing mechanism comprising the present invention, a suitable cam 74 is mounted on the rotary evaporating assembly, such as on the end panel 38 of the drum 32, which is operative in response to rotation of the drum to coact with a cam follower or arm 76 on the float arm 64, effecting a downward movement of the float and float arm from a normal position, as shown in FIGURE 2, to a depressed position, as shown in FIGURE 3. In the position shown in FIGURE 3, the tube 70 of the float control valve assembly 52 is open, enabling a surge of fresh water to enter the water reservoir, causing a rise in the height thereof above the preselected water level 54 and a overflow and drainage of a portion of the water through the overflow weir 72. The drained water from the overflow weir can be conveniently conducted by means of a suitable conduit to a sewer drain. In response to further rotation of the drum in a counterclockwise direction, as viewed in FIGURES 2 and 3, the cam follower 76 is released and the float and float arm rises, effecting a shut-off of the water supply to the reservoir and a control of the level thereof to the preselected level 54.

The specific arrangement and relationship of the water inlet supply, direction of drum rotation and position of the overflow weir are illustrated in FIGURES 1–3 in a preferred relationship. As will be noted, the water inlet supply as defined by the downwardly projecting end of the flexible tube 70 is disposed in one corner of the enclosure, while the overflow weir 72 is located in a diametrically opposite location in the pan 46. In addition, the direction of rotation of the drum is such to effect a circulation of the water from the left toward the right, as viewed in FIGURES 2 and 3, and from the fresh water inlet supply to the overflow weir 72. In accordance with this relationship, the suspended particles and other foreign material are urged toward the overflow weir and are removed during the course of a flushing operation.

It will be appreciated that the number and relative geometry of the cam and cam follower can be varied for any particular installation in consideration of the speed of rotation of the drum so as to provide the requisite flushing action consistent with the magnitude of mineral deposit or the tendency of mineral deposits to build up on the unit. Normally, the use of a single cam 74 on a drum operating at a speed of one revolution per minute, providing a vigorous discharge of water from the water supply during a flushing action, has been found to provide satisfactory operation. In a typical installation, the flushing of the reservoir and a drainage of one gallon of water therefrom for each gallon of water evaporated has been found to provide satisfactory continuous efficient performance of the humidifier apparatus with most hard water supply systems.

It will also be observed that the configuration of the cam and cam follower can be controlled so as to provide the requisite period of depression of the float and float arm in terms of degree of rotation of the drum. In those instances where drum rotation is stopped, such as by the sensing of the humidistat 56, wherein the cam is in coacting relationship with the cam follower on the float arm, a continual flushing of the reservoir occurs and this statistically can occur once each day, providing therewith an automatic complete flushing of the reservoir and a removal of a majority of the mineral deposits therefrom. It will also be apparent that the operation of the flushing mechanism is directly correlated with the quantity of water evaporated by the humidifying unit, which in turn is directly determinative of the amount of mineral deposit accumulation in the unit. This correlation is automatically maintained, avoiding a haphazard flushing operation and a considerable wastage of water.

An alternative satisfactory flushing mechanism applicable to a humidifier apparatus of the general type hereinbefore described, is illustrated in FIGURES 4 and 5, which similarly provides for an intermittent drainage and flushing of the contents of the water reservoir. Like components of the humidifier are designated by the same numerals previously employed in the description of the humidifier apparatus shown in FIGURES 1–3. As shown in FIGURES 4 and 5, the rotary evaporating assembly 18 is operative in response to rotation thereof to effect a deflection of a flexible weir or stand pipe 78, which is mounted at a suitable location in the base of the pan 46. An actuating cam 80 is affixed to and projects longitudinally of the circular end panel 38 on the drum and is adapted to deflect the upper portion of the flexible stand pipe 78 from a normal position, as shown in solid lines in FIGURE 8, to a deflected position as shown in phantom. In the normal position, the upper open end of the flexible stand pipe 78 is positioned at or slightly above the preselected level 54 of the water in the reservoir. In the deflected position, the upper open end of the stand pipe is disposed below the preselected level 54, effecting a withdrawal and drainage of a portion of the water in the reservoir which is discharged through a suitable conduit 82 to a sewer drain. The float control valve assembly 52 in this instance serves the dual function of normally maintaining the height of the water in the reservoir at the preselected level 54 and, in addition, serves to rapidly replenish the quantity of water withdrawn through the flexible stand pipe 78 during a flushing operation.

An alternative satisfactory embodiment from that shown and described in connection with FIGURES 4 and 5 is illustrated in FIGURES 6 and 7, in which a stand pipe 84 is provided, which is mounted at a suitable location in the base of the pan 46 and is formed with an open upper end 86 disposed below the normal preselected level 54 of the water in the reservoir. The upper open end 86 of the stand pipe 84 is normally closed by means of a flapper valve 88 pivotally affixed to the upper end of the stand pipe which is movable from a normally closed position, as shown in solid lines in FIGURE 6, to an open position, as shown in phantom, in response to contact by an actuating cam 90 affixed to the end of an actuating arm 92 connected to and rotatable with the coupling 28. A suitable cam follower 94 is attached to the upper surface of the flapper valve 88, providing pivoting coaction therebetween to effect a movement of the flapper valve to the open position. After the actuating cam 90 disengages the cam follower 94, the flapper valve 88 returns to the normally closed position through the action of gravity. While the flapper valve is in an open position, a portion of the liquid in the water reservoir is withdrawn and discharged through a suitable conduit 96 to a sewer drain. Here again, the float control valve assembly 52 serves the dual function of maintaining the reservoir at the preselected level 54 and additionally serves to rapidly replenish that portion of water withdrawn through the stand pipe 84.

In both of the embodiments illustrated in FIGURES 4–7, the particular location of the stand pipe 78 and 84 is selected so as to provide for optimum flushing action and removal of the dissolved and suspended mineral deposits in the water reservoir. The same benefits of providing a complete flushing of the reservoir approximately once a day, as well as the operation of the flushing mechanism in direct correlation to the quantity of water evaporated from the unit, is achieved as is provided by the flushing mechanism previously described and as illustrated in FIGURES 2 and 3.

While it will be apparent that the invention herein disclosed is well calculated to fulfill the objects above stated, it will be appreciated that the invention is susceptible to modification, variation and change without departing from the proper scope or fair meaning of the subjoined claims.

What is claimed is:

1. A humidifier apparatus comprising an enclosure, means defining a body of water in said enclosure, an evaporating assembly including a rotary member and drive means therefor, said rotary member mounted in said enclosure with the lower portion thereof immersed in said body of water, means for passing air in evaporating relationship relative to said rotary member, supply means for supplying water to said body, control means for controlling the supply of water to normally maintain the upper surface of said body of water at a preselected level, and flushing means intermittently operable in response to an increment of rotation of said evaporating assembly to drain a portion of said body of water and replenish the amount withdrawn effecting a partial flushing of said body of water, said flushing means comprising an overflow weir normally disposed in a first position at an overflow height above said preselected level and positionable by said evaporating assembly to a second position in which it is disposed at a height below said preselected level to effect a draining of water from said body.

2. The humidifier as defined in claim 1, wherein said overflow weir is resiliently biased toward said first position and said flushing means includes coacting means on said evaporating assembly for intermittently deflecting said weir from said first to said second position in response to rotation thereof.

3. A humidifier apparatus comprising an enclosure, means defining a body of water in said enclosure, an evaporating assembly including a rotary member and drive means therefor, said rotary member mounted in said enclosure with the lower portion thereof immersed in said body of water, means for passing air in evaporating relationship relative to said rotary member, supply means for supplying water to said body, control means for controlling the supply of water to normally maintain the upper surface of said body of water at a preselected level, and flushing means intermittently operable in response to an increment of rotation of said evaporating assembly including an overflow weir for draining water from said body in response to the supply of water to said body in an excess amount effecting a rise in the level above said preselected level effecting a partial flushing of said body of water, said control means comprising a float control valve connected to said supply means and including a float for sensing the level of water in said body, and flushing means further including coacting means on said evaporating assembly for intermittently depressing said float and effecting an opening of said valve to effect a supply of said excess amount of water for drainage through said overflow weir.

4. The humidifier as defined in claim 3, further including sensing means for sensing the humidity of the air and operable for de-energizing said drive means when a preselected humidity level is exceeded.

5. A humidifier apparatus comprising an enclosure, means defining a body of water in said enclosure, an evaporating assembly including a rotary member and drive means therefor, said rotary member mounted in said enclosure with the lower portion thereof immersed in said body of water, means for passing air in evaporating relationship relative to said rotary member, supply means for supplying water to said body, control means for controlling the supply of water to normally maintain the upper surface of said body of water at a preselected level, and flushing means intermittently operable in response to an increment of rotation of said evaporating assembly including a drainage port disposed below said preselected level and normally closed valve means operable by said evaporating assembly for opening said drainage port to drain a portion of said body of water and replenish the amount withdrawn effecting a partial flushing of said body of water, said valve means normally biased toward a closed position and including an actuator thereon adapted to coact with cam means on said evaporating assembly for intermittently moving said valve means from said closed position to a position opening said drainage port in response to rotation of said evaporating assembly.

References Cited

UNITED STATES PATENTS

| 2,554,867 | 5/1951 | Mills | 261—28 |
| 2,910,279 | 10/1959 | Wood | 261—92 X |
| 3,074,698 | 1/1963 | Sevald | 261— 92 X |
| 3,189,328 | 6/1965 | Hotchkiss et al. | 261—92 X |
| 3,315,948 | 4/1967 | Martin | 261—92 X |
| 3,385,574 | 5/1968 | Lohman | 261—92 |

TIM R. MILES, Primary Examiner

U.S. Cl. X.R.

261—92